US007689736B2

(12) United States Patent
Kalwitz

(10) Patent No.: US 7,689,736 B2
(45) Date of Patent: Mar. 30, 2010

(54) METHOD AND APPARATUS FOR A STORAGE CONTROLLER TO DYNAMICALLY DETERMINE THE USAGE OF ONBOARD I/O PORTS

(75) Inventor: George A. Kalwitz, Mead, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 314 days.

(21) Appl. No.: 11/268,984

(22) Filed: Nov. 7, 2005

(65) Prior Publication Data

US 2007/0130373 A1    Jun. 7, 2007

(51) Int. Cl.
*G06F 3/00* (2006.01)
(52) U.S. Cl. .......................................... 710/31; 710/15
(58) Field of Classification Search ............... 710/8, 710/15, 106, 22, 112, 162, 2, 36; 719/326; 709/208, 209; 370/216, 389, 401, 360, 522
See application file for complete search history.

(56) References Cited

U.S. PATENT DOCUMENTS

| | | | | |
|---|---|---|---|---|
| 4,270,202 | A | | 5/1981 | Stuttard et al. |
| 5,524,236 | A | * | 6/1996 | Ostrowski .................... 703/24 |
| 5,696,899 | A | | 12/1997 | Kalwitz |
| 5,838,950 | A | * | 11/1998 | Young et al. .................. 703/21 |
| 5,991,829 | A | * | 11/1999 | Giorgio et al. ................ 710/15 |
| 6,012,431 | A | * | 1/2000 | Itoyama et al. ............... 123/480 |
| 6,353,612 | B1 | * | 3/2002 | Zhu et al. ..................... 370/360 |
| 6,421,723 | B1 | | 7/2002 | Tawil |
| 6,691,184 | B2 | | 2/2004 | Odenwald et al. |
| 6,813,656 | B1 | | 11/2004 | Odenwald et al. |
| 7,100,124 | B2 | * | 8/2006 | Cooke et al. .................... 716/1 |
| 7,406,509 | B2 | * | 7/2008 | Meneghini et al. ........... 709/217 |
| 7,616,578 | B2 | * | 11/2009 | Chandrasekaran ........... 370/241 |
| 7,631,107 | B2 | * | 12/2009 | Pandya ........................ 709/250 |
| 2003/0221030 | A1 | * | 11/2003 | Pontius et al. ............... 710/107 |
| 2004/0083285 | A1 | * | 4/2004 | Nicolson ..................... 709/224 |
| 2005/0080881 | A1 | * | 4/2005 | Voorhees et al. ............. 709/220 |

OTHER PUBLICATIONS

SAS, Serial Attached SCSI-2, Oct. 1, 2005, T10.org, pp. 1-624.*
"SmartSwitch 9000 9F426-03 Local Management Appendix", Cabletron Systems, downloaded from http://www.enterasys.com/support/manuals/hardware/2058_01.pdf on Oct. 29, 2005, 14 pages.

* cited by examiner

*Primary Examiner*—Henry W. H. Tsai
*Assistant Examiner*—Cheng-Yuan Tseng
(74) *Attorney, Agent, or Firm*—Thomas J. Lavan; Bradley Knepper

(57) ABSTRACT

Methods and systems for automatically and dynamically identifying capabilities of devices connected to a storage system controller port and setting operating parameters of that port are described. In particular, a storage system controller administers scanning and probing functions to determine capabilities of devices connected to a given port. Based on the determined capabilities of all or a subset of the devices connected to that port, an operating parameter is assigned to that port.

15 Claims, 3 Drawing Sheets

METHOD AND APPARATUS FOR A STORAGE CONTROLLER TO DYNAMICALLY DETERMINE THE USAGE OF ONBOARD I/O PORTS

FIELD

Methods and systems directed to automatically and dynamically determining operating parameters of a controller I/O port are disclosed. In particular, methods and systems that determine operating parameters of a given port by probing and scanning devices of a given storage network are disclosed.

BACKGROUND

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times.

Storage systems or storage systems that provide at least some integration of individual storage devices, such as JBOD (Just a Bunch of Disks), SBOD (Switched Bunch of Disks) or RAID (Redundant Array of Independent Disks) systems have been developed. Storage systems are typically deployed as a number of individual disk drives or other storage devices within an enclosure to present an integrated component to the user. In addition to the individual storage devices, the enclosure may contain one or more power supplies and one or more cooling devices. Integrated storage systems may also include one or more storage system controllers that can be used to control the distribution of data across the individual storage devices in a given storage network.

Historically, it has been up to the administrator/operator of a storage network to determine and ensure that these storage systems are installed properly and the ports of the storage system controllers are properly designated and/or are communicating with the appropriate set of devices. Furthermore, port operating modes have been predetermined, and the orientation of a particular controller input has also been predetermined. In typical storage system controllers, the ports are predefined to be either an initiator port or a target port. Initiator ports typically connect to storage devices and the storage system controller operates these initiator ports in a predetermined fashion according to which commands are sent to the storage devices, as the targets of the storage system controller. The ports of typical storage system controllers can also include ports that are operating in a predetermined target mode. These target ports typically connect to hosts or a Storage Area Network (SAN), and generally wait to receive commands from the hosts or SAN devices that act as initiators for the storage system controller.

Using typical storage system controllers, administrators are required to have knowledge of all devices interconnected to a particular port of a storage system controller. If one port is connected to an array of disks then the administrator needs to know this and install the storage system controller such that the port is connected to the array of disks is configured to operate accordingly. If a port is connected to host devices, or has at least one host device residing thereon, the administrator of the storage network needs to know this information in order to properly configure that port. As storage networks expand due to increases in the required storage capacity of an enterprise, the administrator can be required to retain and track a large amount of this configuration information.

A complicating situation can arise where one of the devices on a given network is replaced. For example, if a device that resides on an initiator port is replaced with a device having host capabilities then the storage system controller may not operate the port properly, at least until the storage system controller is manually updated. Additionally, if cables are not marked properly before installation, a non-trivial amount of work will need to be performed to determine which cables need to be connected to which ports. Accordingly, it would be advantageous to have a controller that can accept connections with different types of devices on a port and configure itself to operate the port in the proper manner.

SUMMARY

Methods and systems for automatically and dynamically identifying appropriate port operating parameters of a storage system controller are provided. In accordance with embodiments of the present invention, a method of automatically and dynamically identifying a port's operating parameters includes first scanning a port to determine or detect if any devices are connected to the port. As used herein, "device" means, but is not limited to, any type of storage network device including hosts, servers, PCs, laptops, storage devices, storage disks, controllers, tape libraries, protocol routers or bridges, and the like. Scanning can be performed in a number of different ways depending on the type of storage network that is being scanned. Second, all of the devices that were found are probed in order to determine the capabilities of the devices. Again, based on the type of storage system that is being used, the way the devices are probed may vary.

After the capabilities of each device connected to a port are determined, the operating mode of the port is set based on the device's determined capabilities. Typically, if all of the devices connected to a given port have capabilities of a target device (e.g., storage disk, array of disks, tape drives or libraries, optical storage, etc.), then the operating mode of the port is set to initiator. This means that the port will operate as an initiator port that sends commands to the subordinate or target devices, which are usually storage disks, an array of disks, additional controllers, or some other type of storage device. Alternatively, if all of the devices are identified as having capabilities of an initiator or host device (e.g., a controller, server, PC, laptop, etc.), the operating mode of the port is set to target. According to further embodiments of the present invention, if some devices connected to a given port are identified as having capabilities of an initiator or host device and some devices connected to that same port are identified as having target device capabilities, the operating mode of the port is set to target/initiator. Other variations of the above-described method could be implemented to ensure that the devices connected to a given port have not changed. In a further embodiment of the present invention, the above-described steps are performed periodically to ensure that the characteristics of all devices connected to a given port have not changed.

In accordance with other embodiments of the present invention, a storage system controller is provided that can automatically and dynamically set the operating parameters for the ports in accordance with the devices to which the ports are connected. In general, the storage system controller includes at least a first port and a processor. The processor comprises a central processing unit (CPU), and an executable memory, where the CPU executes functions stored on the executable memory. A scanning function resides on the memory that is operable to scan the ports to determine or detect what, if any, devices are connected to a given port. Also, an identification function resides on the memory that is operable to probe the identified devices of the at least a first port and dynamically and automatically set the operating parameters/modes of the at least a first port based on the determined capabilities of the devices that have been probed. The operating parameter/mode of the first port may be set as one of initiator, target, or target/initiator. The storage system controller will then operate each port according to the operating mode that has been assigned to the port.

In accordance with embodiments of the present invention, a change detection function may also reside on the memory of the storage system controller. The change detection function is operable to detect if any changes have occurred with respect to a given port on a controller. For instance, if a device on a particular port is removed, replaced, updated, turned-off, or the communication between the device and the port is disrupted, the change detection function can identify that a communication disruption has occurred. In response to the identified change/disruption the identification function is prompted to verify the capabilities of all devices connected to the port or ports on which a change was detected.

Additional features and advantages of the present invention will become more readily apparent from the following description, particularly when taken together with the accompanying drawings.

DETAILED DESCRIPTION

Figure 1:
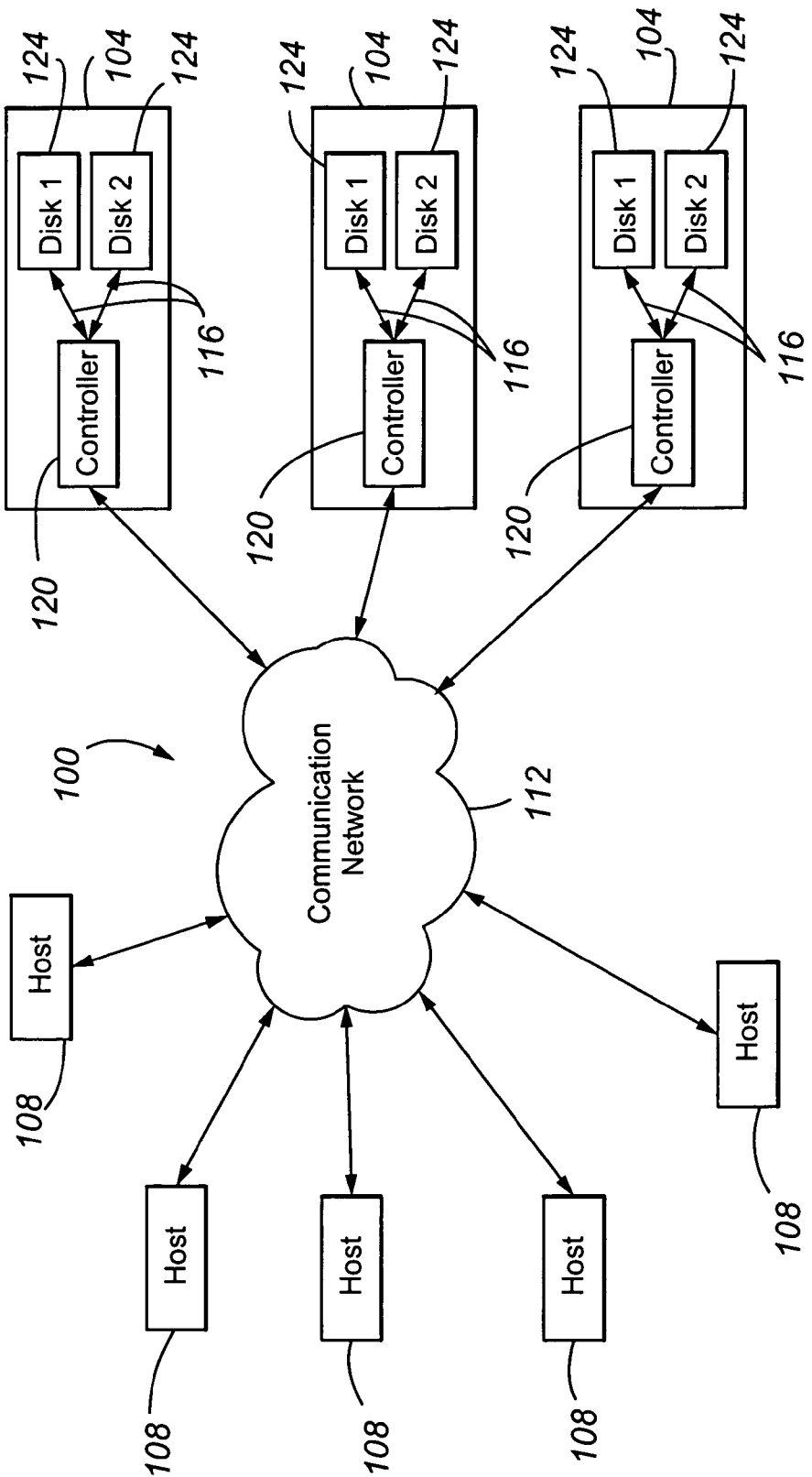
FIG. 1 is a block diagram of components of a storage system in accordance with embodiments of the present invention.

With reference to FIG. 1, a data system 100 associated with a number of storage systems 104 is illustrated. A storage system 104 generally comprises a means for data storage. The storage systems 104 are generally interconnected to one or more host devices, processors or computers 108 by a communication network 112. The host devices 108, also referred to herein as initiator devices 108, are examples of devices that are capable of initiating commands. A host device 108 generally comprises a means for sending and/or receiving data. As can be appreciated by one of skill in the art, a host 108 can be a server or the like that, for example, provides access and read/write authorization to a user device. Also, the host 108 can be a user device for instance, a PC, a laptop, a PDA, and the like.

In accordance with embodiments of the present invention, a storage system 104 may comprise one or more storage system controllers 120 that can be interconnected to initiator and/or target devices. The storage system 124 may also comprise one or more data storage devices 124. Accordingly, a storage system 104 may comprise an integrated storage system. The data storage devices 124 are examples of target devices, which are incapable of initiating commands. Typically, the storage system controllers 120 are connected to the storage devices 124 through a storage device communication link or network 116.

In general, a storage system controller 120 controls the storage and retrieval of data to or from the storage devices 124 included in the associated storage system 104. In addition, the storage system controller 120 may perform other functions, such as parity checking and error correction. A storage system controller 120 may also generally operate to receive and/or execute commands through one or more external user interfaces or ports in association with its storage system 104. A storage system controller 120 in accordance with embodiments of the present invention is also operable to automatically identify and configure the ports 204 (see FIG. 2) that are associated with or included in the storage system controller 120. In a typical storage system 104, one or two storage system controllers 120 are included. As can be appreciated by one of skill in the art, providing multiple storage system controllers 120 is often desirable in order to provide redundancy, and to therefore provide improved fault tolerance and data availability. In addition, providing multiple (e.g. paired) storage system controllers 120 can improve data throughput. Storage system controllers 120 may also be provided as field replaceable units that are received by corresponding slots when installed in a storage system 104.

A storage system 104 may include a number of data storage devices 124. If multiple data storage devices 124 are provided, they may be grouped in various coordinated ways, for example to provide redundancy, and/or to provide improved data throughput as compared to an uncoordinated grouping of data storage devices 124. Examples of different data storage devices 124 that may be included in a storage system 104 include hard disk drives, such as Fibre Channel (FC) hard disk drives. Other examples of data storage devices 124 that may be used in connection with embodiments of the present invention include serial advanced technology attachment (SATA) disk drives, small computer systems interface (SCSI) disk drives, and serial attached SCSI (SAS) drives. Embodiments of the present invention may also utilize data storage devices 124 other than devices utilizing magnetic disks as a storage medium. For example, a data storage device 124 may also include magnetic tape, optical storage devices or solid-state disk devices.

The communication or storage area network 112 generally functions to transport data between storage systems 104 and host devices 108, and can be any data pipe capable of supporting multiple initiators and targets. Accordingly, examples of communication networks 112 include Fibre Channel (FC), SCSI, internet SCSI (iSCSI), parallel SCSI, Ethernet, ESCON, FICON, Infiniband, and like connections or networks. The communication network 112 can also be used for the transfer of notifications of events, communications and/or commands between storage systems 104 and host devices 108. Furthermore, the communication network 112 can comprise one or more interconnected networks of various types.

The storage device communication link or network 116 generally functions to support the transfer of data between storage system controllers 120 and data storage devices 124. Examples of a storage device communication network 116 include a FC, SCSI, iSCSI, parallel SCSI, SAS, connections or networks and the like.

Figure 2:
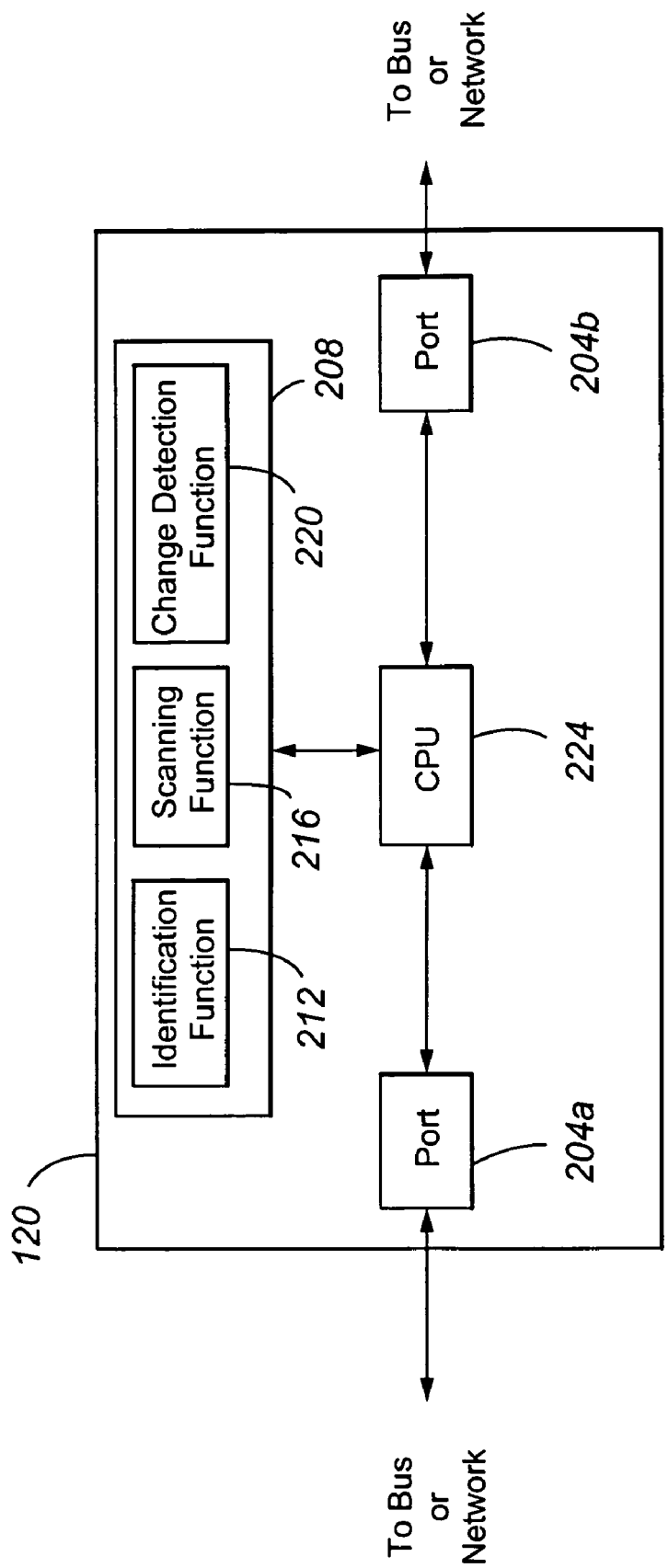
FIG. 2 is a block diagram showing aspects of a storage system controller in accordance with embodiments of the present invention.

Referring now to FIG. 2, components included in and functions performed by a storage system controller 120 will be described in accordance with embodiments of the present invention. In one embodiment, the storage system controller 120 includes at least one port 204, such as first port 204a and second port 204b, and a memory 208. The memory 208 may be a Programmable Read Only Memory (PROM), an Electronically Erasable PROM (EEPROM), Random Access Memory (RAM), Static RAM (SRAM), small hard disk device, flash memory, or any other type of memory that can store executable commands or functions to be performed by a central processing unit (CPU) 224. A number of different executable functions may be stored in the memory 208 of the storage system controller 120. In one embodiment, the memory 208 includes an identification function 212, a scanning function 216, and a change detection function 220. In one embodiment, the CPU 224 accesses some or all of these functions and executes them to automatically scan and identify devices connected to a port 204 through a communication network 112 or storage device communication network 116. As can be appreciated by one of skill in the art, a storage system controller 120 CPU 124 may be implemented by or in connection with one or more general purpose processors, application specific integrated circuits (ASICs) or the like, executing instructions stored as firmware or software. Furthermore, a storage system controller 120 may include volatile and non-volatile memory for use in connection with the execution of the instructions and for the storage of data used in implementing functions of the storage system controller 120.

Generally, the scanning function 216 provides a means for scanning a port 204. More particularly, the scanning function 216 provides preliminary information relating to devices 108 and/or 124 connected to a given port 204. The scanning function 216 is executed by the CPU 224 to determine, in some embodiments, the number, type of connection and/or various other operating characteristics of the devices 108 and/or 124. Initially, the scanning function 216 may determine the type of network connection between the port and the devices 108 and/or 124. The scanning function 216 then scans the devices 108 and/or 124 connected to the port 204 in order to collect information relating to the devices connected thereto. The way that the scanning function 216 scans a given network 112 or 116 depends on the type of network that exists between the port 204 and devices 108 and/or 124. For example, if the network 112 or 116 is an FC network, an arbitrated loop map could be used to determine how many, if any, devices 108 and/or 124 are connected to a given port 204 and where those device 108 and/or 124 are. A name server could also be interrogated for information relating to the devices 108 and/or 124 in a FC network 112 or 116. If the network 112 or 116 is an iSCSI network, the Simple Name Server (iSNS) could be interrogated to determine general information about devices 108 and/or 124 connected to a port 204. Furthermore, if the network 112 or 116 used is a Serial Attached SCSI (SAS), the topology could be traversed to gain general information about devices 108 and/or 124 connected to port 204. Once the port has been scanned, more information may need to be gathered in order to determine the operating capabilities of devices 108 and/or 124 connected to a given port 204.

The identification function 212 is executed by the CPU 224 to gain further information about devices 108 and/or 124 connected to a port 204. Generally, the identification function 212 provides a means for probing and/or identifying devices 108 and/or 124 connected to the port 204 and a means for determining/assigning operating parameters/modes to that port 204. As stated above, the devices 108 and/or 124 do not need to have their capabilities previously determined. Rather, the identification function 212, is operable to scan the port 204 in a variety of ways, based on the type of network 112 or 116 connections used, to determine characteristics of the devices 108 and/or 124 connected to that port 204. For example, whether connected devices 108, 124 are targets or initiators can be determined. Devices 108 and/or 124 that are identified as targets tend to have subordinate qualities/capabilities relative to the storage system controller 120. For instance, devices 124 with no command initiation abilities or that are primarily reactive and wait to receive commands from an initiator 108 are target devices 124. Alternatively, devices 108 that are identified as an initiator/host tend to have dominant qualities/capabilities relative to the storage system controller 120. By way of example, initiator devices 108 are capable of initiating commands and generally are active. In particular, initiator devices 108 send commands to target devices 124 and generally wait for responses from target devices 124. After identifying or determining whether the devices 108, 124 connected to a port 204 are all targets, all initiators, or whether some are targets and some are initiators, the identification function 212 can assign the operating parameter/mode to the port 204 based on the determined characteristics of the devices 108 and/or 124 connected to that port 204.

The identification function 212 can use various commands or queries to determine the characteristics of the devices 108 and/or 124. For example, the PRLI link services command and/or use the name server registration information if the network 112 or 116 is an FC network. As a further example, node information in the network topology can be used in an SAS network 112 or 116. In another example, the identification function 212 can use the iSNS registration information if the network 112 or 116 is an iSCSI network. In addition, an SCSI command set could be used (i.e., Test Unit Ready (TUR), Inquiry, Mode Pages, etc.) to probe each device 108 and/or 124 to learn about its capabilities, including whether it is an initiator/host or target.

Once information about the capabilities of devices 108 and/or 124 connected to a given port 204 is identified, the identification function 212 makes intelligent choices about the operating mode of each port 204. In accordance with one embodiment of the present invention, if only devices (e.g. storage devices 124) having target capabilities are detected on a given port 204, then the identification function 212 sets the operating parameter/mode of that port 204 to initiator. Alternatively, if host devices 108 or other devices displaying host capabilities are detected on a port 204, then the identification function 212 determines if all of the devices connected to that port 204 have host capabilities. If all of the devices connected to the port 204 do have host capabilities, the identification function 212 sets the operating parameter/mode of that port 204 to target. If the identification function 212 determines that only a subset of the devices connected to the port are host devices 108, then the operating parameter/mode of that port 204 is set to target/initiator. Additionally, the operating parameter/mode of the port 204 may be set to target/initiator in the event that at least one device 108 and/or 124 has both initiator and target capabilities. It will be appreciated that ports 204 defined as initiators are treated differently by the controller 120 than ports 204 that are defined as targets. Embodiments of the present invention therefore provide systems and methods that allow storage system controllers 120 to automatically and dynamically define port-operating parameters/modes after scanning and probing devices 108 and/or 124 connected to a given port 204.

In accordance with further embodiments of the present invention, the memory 208 further includes a change detection function 220. Generally, the change detection function 220 provides a means for detecting a change associated with a port 204. For example, the change detection function 220 may be operable to detect any interruption in communication between a device 108 and/or 124 and a port 204. This detected interruption is communicated to the CPU 224, which then initiates the scanning function 216 and the identification function 212. Communications interruptions or changes related to a port 204 can be caused by the changing of a device 108 and/or 124, the powering up/down of a device 108 and/or 124, the removal of a device 108 and/or 124 from the network 112 or 116, the addition of a device 108 and/or 124 to the network 112 or 116, etc. The change detection function 220 allows the storage system controller 120 to maintain up to date operating parameters/modes for any port 204 that it includes or controls.

In an alternative configuration of the present invention, the operations performed by the identification function 212 and the scanning function 216 may be set to periodically repeat. By having the identification function 212 and the scanning function 216 run periodically, the need for a change detection function 220 can be eliminated. The operations can be set to run automatically every day, hour, minute, etc. This action ensures that the storage system controller 120 has its ports 204 running in the correct mode, which in turn means that the data is being handled as efficiently as possible.

Figure 3:
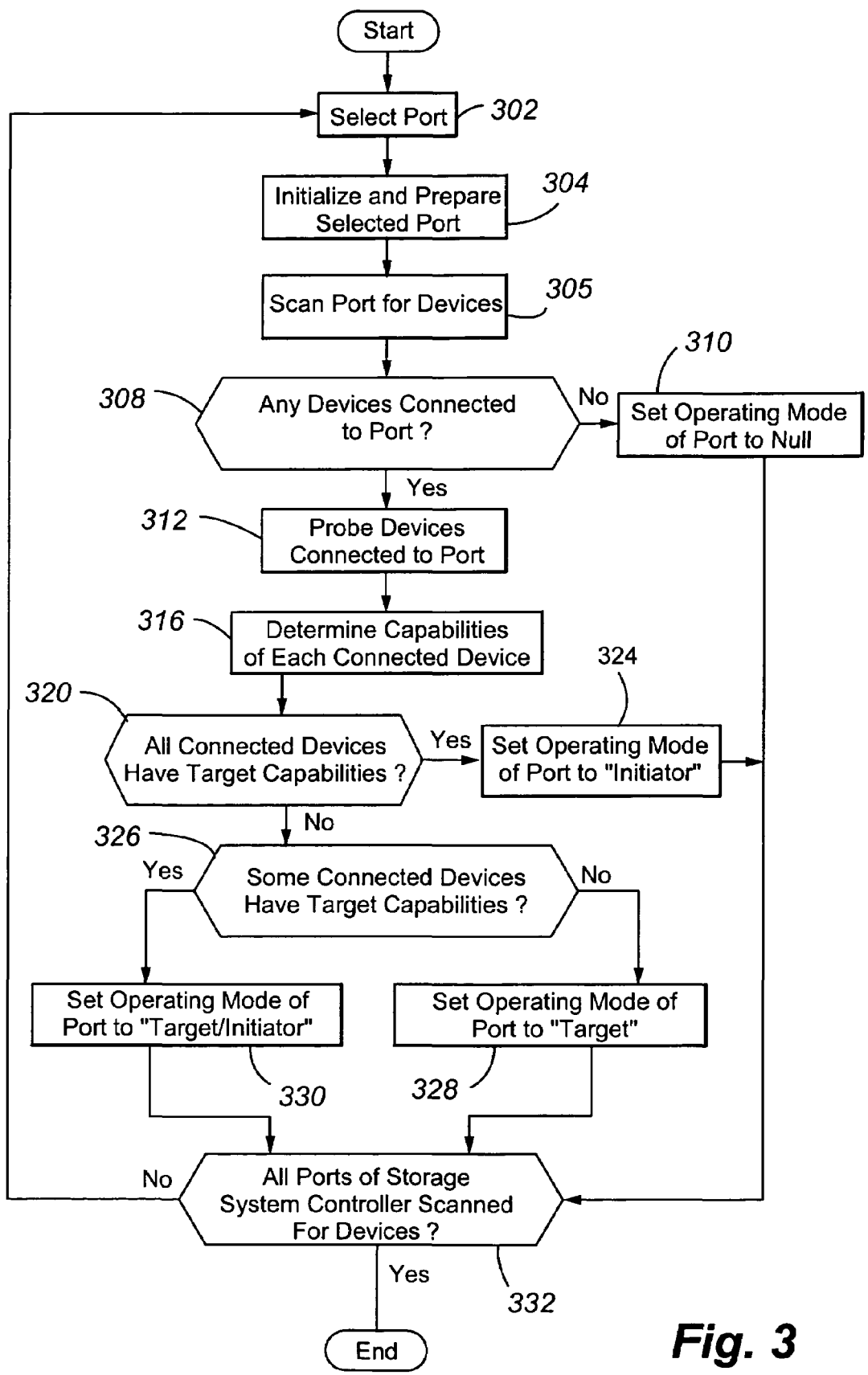
FIG. 3 is a flow chart depicting aspects of the operation of a storage system controller in accordance with embodiments of the present invention in connection with automatically determining the correct operating mode for a particular port.

Referring now to FIG. 3, a method of automatically and dynamically determining the operating parameter/mode of storage system controller 120 ports 204 in accordance with embodiments of the present invention is illustrated. Initially, a port 204 of a storage system controller 120 is selected (step 302). At step 304 the selected port 204 is initialized and prepared. Initializing and preparing a port 204 generally includes the step of inserting a storage system controller 120 into a storage system 104 such that the selected port 204 connects to a cable or other interconnection leading to one or more devices 108 and/or 124. Before the present invention, this particular step took a great deal of care and attention to ensure that the storage system controller 120 was inserted properly and the ports 204 were accurately configured. However, the present invention eliminates these previous concerns by automatically configuring the storage system controller 120 to operate each of its ports 204 correctly.

After the selected port 204 is initialized, the port scanning function 216 scans the port 204 for any devices 108 and/or 124 connected thereto in step 306. In step 308, it is determined if any devices 108 and/or 124 are connected to the selected port 204. If no devices 108 and/or 124 are connected to the selected port 204 then the port-operating mode may be set to null or to some other predetermined mode in step 310. However, if there is at least one device 108 and/or 124 connection detected on the selected port 204, then the device(s) 108 and/or 124 is probed in step 312 by the identification function 212. A number of probing steps, as described above, can be performed based on the type of network 112 or 116 that exists between the storage system controller 120 and the device 108 and/or 124. After all of the devices 108 and/or 124 have been properly probed in step 312, each device's 108 and/or 124 capabilities are determined in step 316. In step 320 it is determined if all of the devices probed on the selected port 204 have characteristics associated with target devices (e.g. if all are data storage devices 124). If so, then the operating parameter/mode of the port 204 is set to initiator in step 324. However, if at least one of the devices 108 and/or 124 does not have target capabilities (e.g., at least one is a host or an initiator device 108), it is determined if some of the devices 108 and/or 124 connected to the port 204 have target capabilities (step 326). If none of the devices 108 and/or 124 have target capabilities, then the operating parameter/mode of the port 204 is set to target (step 328). However, if at least one of the devices 108 and/or 124 connected to port 204 has target capabilities, then the operating parameter/mode of the port 204 is set to target/initiator (step 330). In certain embodiments, the scanning function 216 performs steps 306 and 308, while the identification function performs steps 312, 316, 320, 324 and 328. Accordingly, based on the capabilities of the devices 108 and/or 124 connected to a port 204, the operating parameter/mode of that port 204 is assigned.

At step 332, after setting the operating mode of the selected port 204 to null (at step 310), initiator (at step 324), target (at step 328), or target/initiator (at step 330), a determination is made as to whether all of the ports 204 included in the storage system controller 120 have been scanned for devices 108 and/or 124 and the capabilities of any such devices 108 and/or 124 have been determined. If all of the ports 204 have been scanned, the process may end. If ports 204 remain to be scanned in order to determine the capabilities of any connected devices 108 and/or 124, the process may return to step 302, and a next port 204 can be selected.

In accordance with embodiments of the present invention, the devices 108 and/or 124 connected to a port 204 only have to be scanned for target (or host/initiator) capabilities. Logically, if the number of counted devices 108 and/or 124 connected to a given port 204 equals the number of devices having target (host/initiator) capabilities, then the operating parameter/mode of the port 204 can be set to initiator (target). Additionally, if the number of devices 108 and/or 124 with target (host/initiator) capabilities is less than the number of devices counted in the probing step, but not equal to zero, then the operating parameter/mode of the port 204 may be set to target/initiator. Furthermore, if the number of devices 108 and/or 124 having target (host/initiator) capabilities equals zero for a given port 204, then the operating parameter/mode of the port 204 can be set to target (initiator).

As can be appreciated by one of skill in the art, more than one port 204 can be scanned, multiple devices connected to a port 204 can be probed, and/or ports 204 can be assigned operating modes simultaneously. Also, each port 204 in a given controller 120 may have the above-described steps performed on them one at a time. In accordance with embodiments of the present invention, a storage system controller 120 that has a number of ports 204 and the ability to automatically and dynamically determine port 204 operating modes as described herein can vastly reduce the amount of work and knowledge that is required of a storage system administrator in order to properly configure the ports 204 or to set up/install the controller 120 and also allows the controller 120 to determine an optimal way of treating each port 204 connected thereto. Furthermore, the ports 204 of a storage system controller 120 do not need to be preconfigured or determined as either an initiator or a target port 204. As a result, a user can complete almost any network 112 or 116 connection to any port 204 of a storage system controller 120, and the storage system controller 120 will then determine how to configure the port 204.

In accordance with further embodiments of the present invention, a system configuration interface or wizard, for example running on a host 108, may be provided that helps guide a user or system administrator to connect the cables/ports in an optimal way is provided. Specifically, a device connected to the communication network 112 may have a user interface that allows the user to interact and see how the storage system controller 120 is treating a given set of ports 204. The system configuration wizard is particularly useful as a data storage system becomes more and more complex.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method of identifying a device interconnected to a port of a storage system controller, comprising:
   (a) scanning by said storage system controller a network external to said storage system controller through said port of the storage system controller to determine whether any devices are connected to said first port of said storage system controller;
   (b) in response to said scanning, determining by said storage system controller that at least one device is connected to said first port of said storage system controller;
   (c) probing by said storage system controller said at least one device that is connected to said first port of said storage system controller;
   (d) in response to said probing, determining by said storage system controller capabilities of said at least one device connected to said first port of said storage system controller;
   (e) in response to said determining capabilities and based on said determined capabilities, determining, by said storage system controller, a proper operating mode for said first port of said storage system controller;
   (f) in response to said determining a proper operating mode for said first port of said storage system controller, first setting, by said storage system controller, an operating mode for said first port of said storage system controller, wherein said first port of said storage system controller is set to one of an initiator if every one of said devices has target device capabilities, a target if every one of said devices has initiator device capabilities, and a target/initiator if less than all devices have target device capabilities and at least one device has target device capabilities, wherein prior to said first setting an operating mode for said first port of said storage system controller a proper operating mode for said first port of said storage system controller is undetermined, and wherein said proper operating mode of said first port of said storage system controller is set after said first port of said storage system controller is interconnected to said at least one device, wherein steps (a) through (f) are iteratively performed periodically; and
   (g) after said first setting an operating mode of said first port of said storage system controller, transmitting data between said first port of said storage system controller and said at least one device according to the set mode.

2. The method of claim 1, further comprising:
   (h) scanning by said storage system controller a network external to a second port of said storage system controller;
   (i) in response to said scanning, determining by said storage system controller that at least one device is connected to said second port of said storage system controller;
   (j) probing said at least one device that is connected to said second port of said storage system controller;
   (k) in response to said probing, determining by said storage system controller capabilities of said at least one device connected to said second port of said storage system controller; and
   (l) based on said determined capabilities of said at least one device connected to said second port of said storage system controller, setting by said storage system controller an operating mode for said second port of said storage system controller, wherein said operating mode for said second port of said storage system controller is set to one of initiator, target, and target/initiator.

3. The method of claim 2, wherein said determining capabilities of said at least one device connected to said first port of said storage system controller and said determining by said storage system controller capabilities of said at least one device connected to said second port of said storage system controller are performed at substantially the same time.

4. The method of claim 2, wherein said operating mode set for said first and second port of said storage system controller are different.

5. The method of claim 1, further comprising:
   (h) detecting a change related to said first port of said storage system controller and in response to detecting said change, performing steps (a) through (f).

6. The method of claim 1, wherein said at least one storage device interconnects to said storage system controller by a network.

7. A storage system controller for use in a storage device network, comprising:
   (a) a first port;
   (b) a processor, comprising:
   (i) a scanning function executing on the processor of the storage system controller that scans the first port of the storage system controller; and
   (ii) an identification function running on the processor of the storage system controller that probes devices connected to the first port of the storage system controller, wherein the identification function determines operating parameters of the first port of the storage system controller based on capabilities of the devices connected to the first port of the storage system controller, wherein in response to the determination by the identification function an operating mode for the first port of the storage system controller is set to one of an initiator if every one of said devices has target device capabilities, a target if every one of said devices has initiator device capabilities, and a target/initiator if less than all devices have target device capabilities and at least one device has target device capabilities, wherein the scanning function and identification function are iteratively performed periodically, and wherein after the operating mode for the first port of the storage system controller is set by the storage system controller the storage system controller uses the first port of the storage system controller in connection with the storage and retrieval of data to and from at least one of the devices connected to the first port of the storage system controller.

8. The storage system controller of claim 7, wherein the storage device network is at least one of a Fibre Channel network, an Ethernet Network or an SCSI bus, and an SAS network.

9. The storage system controller of claim 7, further comprising a second port, wherein the scanning function of the storage system controller scans the second port of the storage system controller, and wherein the identification function probes devices connected to the second port of the storage system controller and determine operating parameters of the second port of the storage system controller based on capabilities of devices connected to the second port of the storage system controller, and wherein the identification function determines that the second port of the storage system controller is one of an initiator port, a target port, and a target/initiator port.

10. The storage system controller of claim 9, wherein the identification function identifies the proper operating mode of the first port of the storage system controller as an initiator port and the proper operating mode of the second port of the storage system controller as a target port.

11. The storage system controller of claim 7, further comprising a change detection function executing on the processor of the storage system controller that identifies when a change has occurred with respect to the first port of the storage system controller, wherein the change detection function communicates a change in the first port of the storage system controller and in response to the communicated change, the identification function determines operating parameters of the first port of the storage system controller.

12. A storage system, comprising:
a first storage system controller, including:
(a) at least a first port;
(b) a means for scanning said at least a first port;
(c) a means for probing and identifying capabilities of devices connected to said at least a first port;
(d) a means for determining an appropriate operating parameter of the at least a first port of said first storage system controller based on the identified capabilities of devices connected to said at least a first port of said first storage system controller; and
(e) a means for assigning, by the first storage system controller, said determined appropriate operating parameter to said at least a first port of said first storage system controller, wherein said first port of said first storage system controller is assigned to be one of an initiator port if every one of said devices has target device capabilities, a target port if every one of said devices has initiator device capabilities, and a target/initiator port if less than all of said devices has target device capabilities and at least one of said devices has target device capabilities, wherein said means for scanning, said means for probing and identifying, said means for determining, and said means for assigning are iteratively performed periodically, and wherein after an operating parameter is assigned to said first port of said first storage system controller data is passed between said first port of said first storage system controller and at least one of said devices connected to said first port of said first storage system controller.

13. The system of claim 12, further comprising a network coupled to the first port of the first storage system controller and the devices, wherein said network is at least one of a Fibre Channel network, an Ethernet Network, an SCSI bus, and an SAS network.

14. The system of claim 12, said first storage system controller further comprising at least a second port wherein said means for scanning scans said at least a second port of said first storage system controller, wherein said means for probing probes devices connected to said at least a second port of said first storage system controller, wherein said means for assigning assigns an operating parameter to said at least a second port of said first storage system controller based on capabilities of said devices connected to said at least a second port of said first storage system controller, and wherein said second port of said first storage system controller is assigned to be one of an initiator port, a target port, and a target/initiator port.

15. The system of claim 12, further comprising a means for detecting change that identifies when a change has occurred with respect to said at least a first port of said first storage system controller, wherein said means for detecting change communicates a change in said at least a first port of said first storage system controller and in response to said communicated change, said means for probing probes said devices connected to said at least a first port of said first storage system controller.

\* \* \* \* \*